(12) United States Patent
Pelleg et al.

(10) Patent No.: US 11,520,840 B2
(45) Date of Patent: Dec. 6, 2022

(54) METHOD AND SYSTEM FOR LITERACY ADAPTIVE CONTENT PERSONALIZATION

(71) Applicant: YAHOO ASSETS LLC, Dulles, VA (US)

(72) Inventors: Dan Pelleg, Haifa (IL); Ran Wolff, Geva-Carmel (IL); Avihai Mejer, Atlit (IL)

(73) Assignee: YAHOO ASSETS LLC, Dulles, VA (US)

( * ) Notice: Subject to any disclaimer, the term of this patent is extended or adjusted under 35 U.S.C. 154(b) by 196 days.

(21) Appl. No.: 16/726,548

(22) Filed: Dec. 24, 2019

(65) Prior Publication Data

US 2021/0191997 A1 Jun. 24, 2021

(51) Int. Cl.
*G06F 16/9535* (2019.01)
*G06F 16/21* (2019.01)
*G06F 16/9538* (2019.01)

(52) U.S. Cl.
CPC ........ *G06F 16/9535* (2019.01); *G06F 16/219* (2019.01); *G06F 16/9538* (2019.01)

(58) Field of Classification Search
None
See application file for complete search history.

(56) References Cited

U.S. PATENT DOCUMENTS

| | | | |
|---|---|---|---|
| 2014/0189484 A1* | 7/2014 | Fountenberry | G06F 40/197 715/229 |
| 2020/0167524 A1* | 5/2020 | Hunter | G09B 11/00 |

* cited by examiner

*Primary Examiner* — Amresh Singh
(74) *Attorney, Agent, or Firm* — Venable LLP

(57) ABSTRACT

The present teaching relates to a method, system, and programming for content personalization. A request is received from a user to obtain a content item. Information indicative of a literacy-level of the user is obtained and the content item to be provided to the user is retrieved. The content item is modified by updating information included in the content item based on the literacy-level of the user to generate an updated content item. The updated content item is provided to the user in response to the request.

18 Claims, 11 Drawing Sheets

METHOD AND SYSTEM FOR LITERACY ADAPTIVE CONTENT PERSONALIZATION

BACKGROUND

1. Technical Field

The present teaching generally relates to methods, systems, and programming for content personalization. Particularly, the present teaching is directed to methods, systems and programming for literacy-aware personalization of content.

2. Technical Background

The Internet has made it possible for a person to electronically access virtually any content at any time and from any location. The Internet technology facilitates information publishing, information sharing, and data exchange in various spaces and among different persons. Typically, users issue a search query to a search engine to obtain desirable content. A search engine is one type of information retrieval system that is designed to help users search for and obtain access to information that is stored in a computer system or across a network of computers. In response to a query from a user, the search engine can search different content providers online to obtain search results matching the query. Content providers can be a publisher, a content portal, or any other sources from which content can be obtained.

Typically, when a user is provided with the search results e.g., web document, the user consumes the web document and utilizes tools (i.e., applications) to simplify text included in the web document. For instance, while the user is consuming the web document, the user may manually select words, phrases etc., from the web document which are difficult for the user to understand. Such selected words, phrases etc., are provided to an online tool, which in turn provides the user replacement words, phrases etc. For example, the online tool may provide a synonym of a word selected by the user.

Such a method of replacing content in a web document has several drawbacks. The process is tedious and time consuming. The user has to manually select the words and input into the online tool. More importantly, it is not guaranteed that the replacement word(s), phrases etc., provided by the online tool are understandable by the user. In such a scenario, the user has to simply repeat the above described process and provide the online tool with another word to be replaced. As such, user experience may be severely degraded and the user may move to another system. Accordingly, there is a need to devise a solution to address the above stated problems.

SUMMARY

The teachings disclosed herein relate to methods, systems, and programming for content personalization. Particularly, the present teaching is directed to methods, systems and programming for literacy-aware personalization of content.

One aspect of the present disclosure provides for a method, implemented on a machine having at least one processor, storage, and a communication platform capable of connecting to a network for content personalization. The method comprises the steps of: receiving a request from a user; obtaining information indicative of a literacy-level of the user; retrieving a content item to be provided to the user based on the request; modifying the content item by updating information included in the content item based on the literacy-level of the user to generate an updated content item; and providing the updated content item to the user in response to the request.

By one aspect of the present disclosure, there is provided a system for content personalization. The system comprises: a request processing unit implemented by a processor and configured to receive a request from a user, and a user literacy-score obtaining unit implemented by the processor and configured to obtain information indicative of a literacy-level of the user. The system further comprises a web content retrieving unit implemented by the processor and configured to retrieve a content item to be provided to the user based on the request, a version generating unit implemented by the processor and configured to modify the content item by updating information included in the content item based on the literacy-level of the user to generate an updated content item, and a content rendering unit implemented by the processor and configured to provide the updated content item to the user in response to the request.

Other concepts relate to software for implementing the present teaching. A software product, in accord with this concept, includes at least one machine-readable non-transitory medium and information carried by the medium. The information carried by the medium may be executable program code data, parameters in association with the executable program code, and/or information related to a user, a request, content, or other additional information.

In one example, there is provided, a non-transitory computer readable medium including computer executable instructions, wherein the instructions, when executed by a computer, cause the computer to perform a method for content personalization. The method comprises the steps of: receiving a request from a user; obtaining information indicative of a literacy-level of the user; retrieving a content item to be provided to the user based on the request; modifying the content item by updating information included in the content item based on the literacy-level of the user to generate an updated content item; and providing the updated content item to the user in response to the request.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
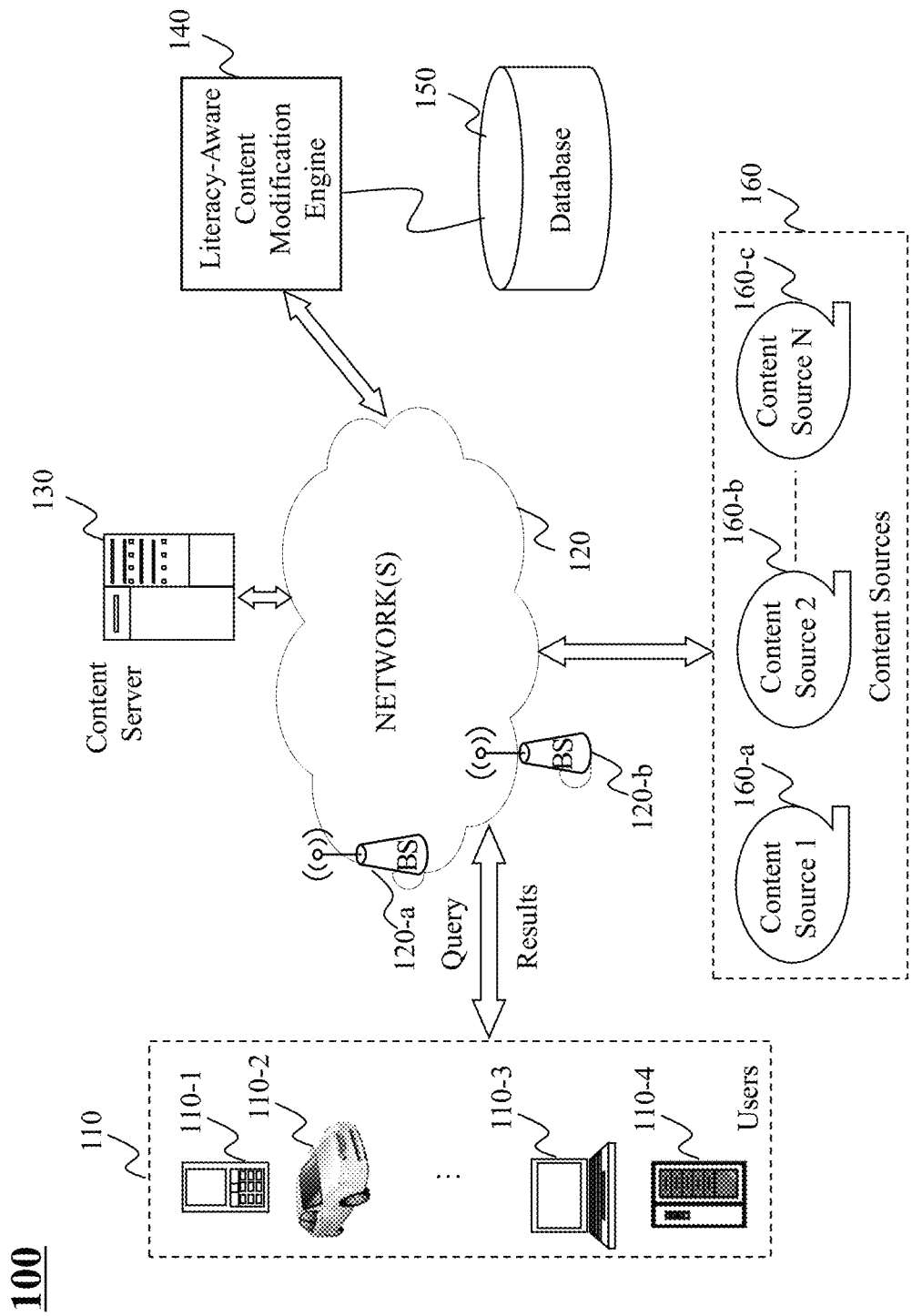
FIG. 1 illustrates an exemplary system configuration in which a literacy-aware content modification engine can be deployed, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein. Example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

FIG. 1 illustrates an exemplary system configuration in which a literacy-aware content modification engine 140 can be deployed in accordance with various embodiments of the present teaching. In the configuration 100 depicted in FIG. 1, the literacy-aware content modification engine 140 is directly connected to a network 120 and operates as an independent service on the network. In FIG. 1, the exemplary system 100 includes users 110, a network 120, a content server 130, the literacy-aware content modification engine 140, a database 150, and one or more content sources 160, including content source 1 160-a, content source 2 160-b, ..., and content source N 160-c.

The network 120 may be a single network or a combination of different networks. For example, the network may be a local area network (LAN), a wide area network (WAN), a public network, a private network, a proprietary network, a Public Telephone Switched Network (PSTN), the Internet, a wireless network, a cellular network, a virtual network, or any combination thereof. A network may also include various network access points, e.g., wired or wireless access points such as base stations or Internet exchange points 120-a, ..., 120-b, through which a data source may connect to the network 120 in order to transmit information via the network and a network node may connect to the network 120 in order to receive information. In one embodiment, the network 120 may be a content distribution network, which connects users 110 to the content server 130 and the literacy-aware content modification engine 140, which provide the users with relevant content obtained from the content sources 160, and which is personalized based on a literacy level of the user.

Users 110 may be of different types such as users connected to the network via desktop connections (110-4), users connecting to the network via wireless connections such as through a laptop (110-3), a handheld device (110-1), or a built-in device in a motor vehicle (110-2). A user may send a query to the content server 130 or the literacy-aware content modification engine 140 via the network 120 and receive (as response) a corresponding search result (content item) through the network 120. By one embodiment, a user's query including a keyword(s) or phrases may be directed to the content server 130. Alternatively, in some embodiments, the query may be directed directly to the literacy-aware content modification engine 140. Accordingly, the user's query may be handled by either the content server 130 or the literacy-aware content modification engine 140, both of which may search for relevant content, based on the query, from the content sources 160.

Content sources 160, may correspond to an entity, whether an individual, a firm, or an organization, publishing or supplying content, including a blogger, television station, a newspaper issuer, a web page host, a content portal, an online service provider, or a game server. For example, in connection to an online or mobile ad network, content source 160 may be an organization such as CNN.com, a content portal such as YouTube and Yahoo.com, or a content-soliciting/feeding source such as Twitter or blogs.

By one embodiment, the user 110 may issue a query to either the content server 130 or the literacy-aware content modification engine 140 to retrieve (from content sources 160) content items (e.g., web documents) that is/are desired by the user 110. The user 110 may issue the query in the form of keyword(s), phrases, etc. By one embodiment, the content server 130 may utilize the keywords/phrases included in the query to retrieve relevant content items from the content sources 160. Further, the literacy-aware content modification engine 140 may modify/update information included in the retrieved content items (e.g., text of the documents) based on an implicitly measured literacy level of the user to generate updated content items. The updated content items are provided as results to the user in response to the query.

Figure 2:
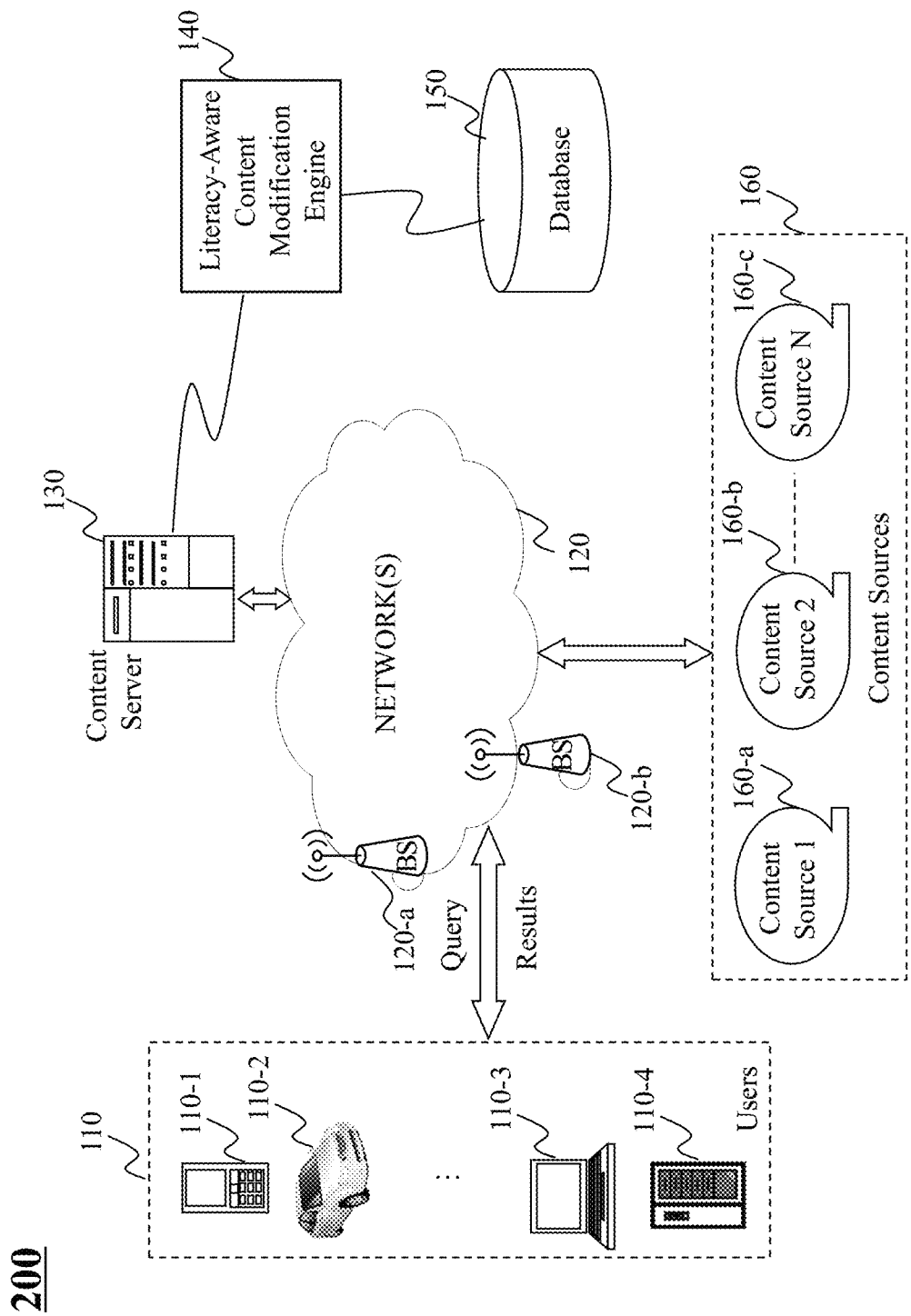
FIG. 2 illustrates another exemplary system configuration in which a literacy-aware content modification engine can be deployed, according to an embodiment of the present teaching.

As stated previously, the embodiment illustrated in FIG. 1 includes the literacy-aware content modification engine 140 operating as an independent service (i.e., a standalone service) on the network 120. In FIG. 2, an alternate configuration is provided, wherein the literacy-aware content modification engine 140 operates as a special module in the backend of the content server 130. When there are multiple content servers (not shown), each may have its own backend module for content processing/modification purposes. Nonetheless, it must be appreciated that the literacy-aware content modification engine 140 as shown in FIG. 2 performs functions similar to those described above with reference to FIG. 1. In what follows, there is provided a detailed description of the processing performed by the literacy-aware content modification engine 140.

Figure 3:
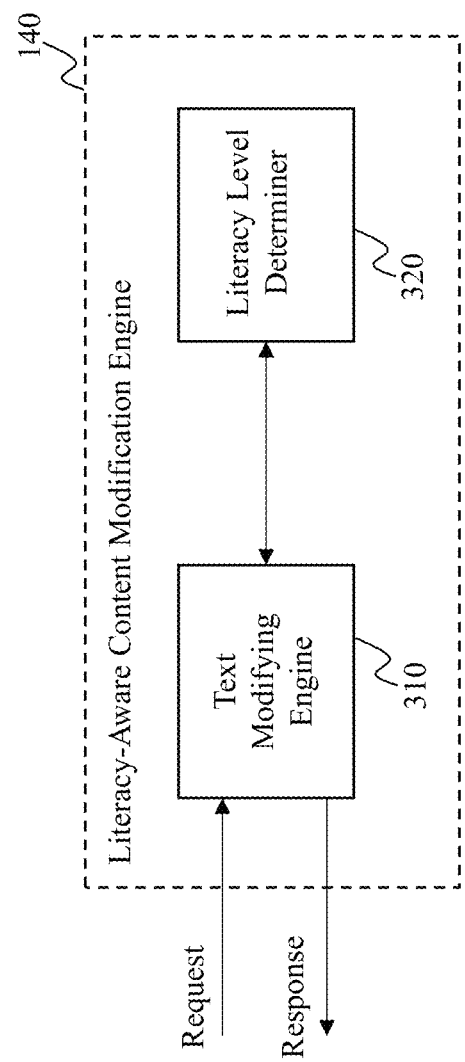
FIG. 3 depicts an exemplary system diagram of a literacy-aware content modification engine, according to various embodiments of the present teaching.

FIG. 3 depicts an exemplary system diagram of a literacy-aware content modification engine 140, according to various embodiments of the present teaching. The literacy-aware content modification engine 140 includes a text modifying engine 310 and a literacy level determiner 320. By one embodiment, the text modifying engine 310 is configured to receive a request for web content (e.g., web document) from a user and provide in response to the request, a modified web document. The text modifying engine 310 is configured to modify the web document based on a literacy level of the user determined by the literacy level determiner 320. Details regarding the literacy level determiner 320 are described next with reference to FIGS. 4-5 and details regarding the text modifying engine 310 are described later with reference to FIGS. 8-9

Figure 4:
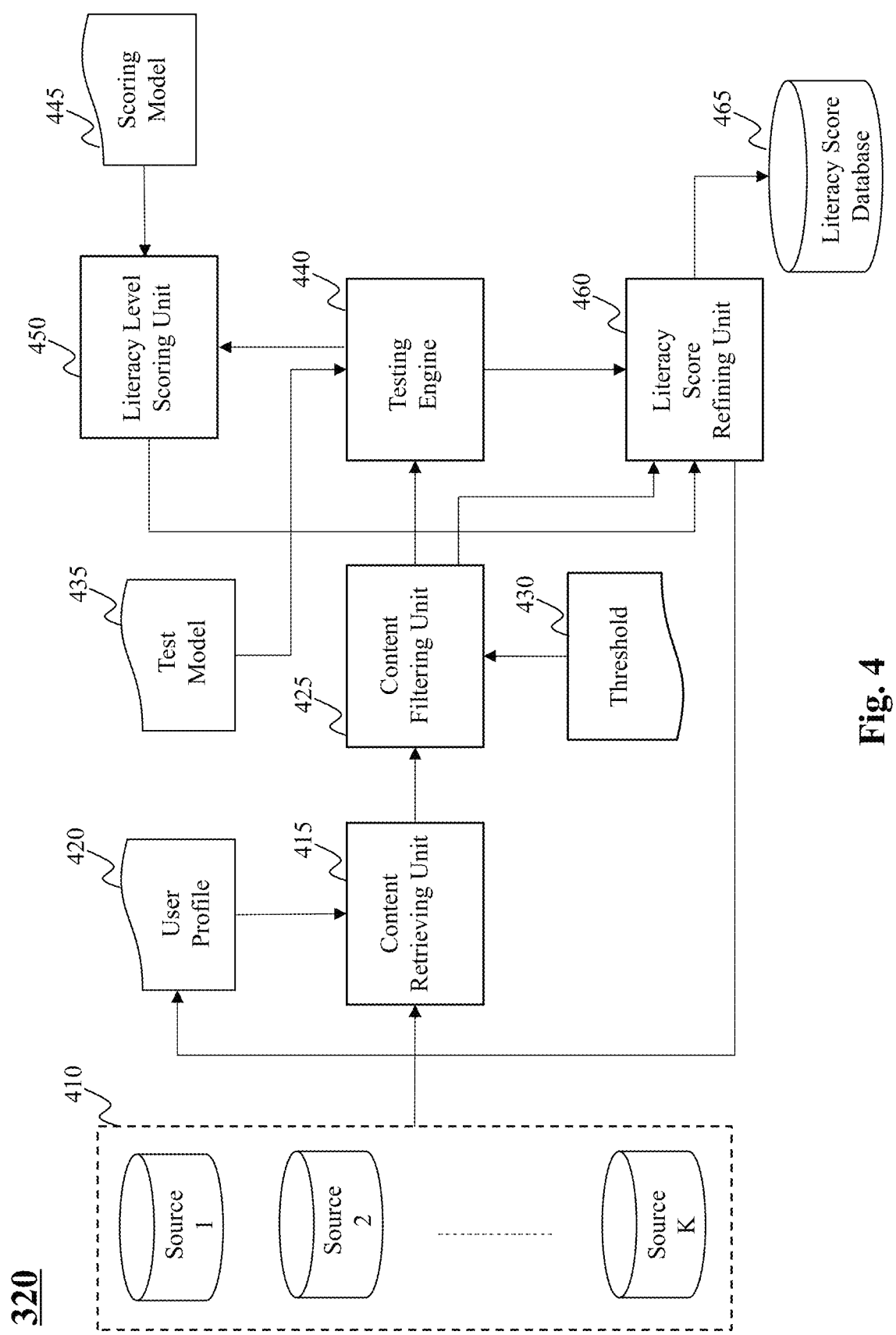
FIG. 4 depicts an exemplary system diagram of a literacy level determiner, according to various embodiments of the present teaching.

Turning now to FIG. 4, there is depicted an exemplary system diagram of a literacy level determiner 320, according to various embodiments of the present teaching. The literacy level determiner 320 comprises a content retrieving unit 415, a content filtering unit 425, a testing engine 440, a literacy level scoring unit 450, a literacy score refining unit 460, and a literacy score database 465.

The content retrieving unit 415 obtains information related to a user via a user profile 420. Based on the obtained information of the user (e.g., user ID), the content retrieving unit 415 retrieves content items previously consumed by the user from a plurality of data sources 410 e.g., data source 1, data source 2, . . . and data source K. The retrieved content items are filtered by the content filtering unit 425. By one embodiment, the content filtering unit 425 utilizes a threshold 430 (e.g., a dwell time threshold) to filter the retrieved content items. In this manner, only the content items corresponding to which the user had spent a significant amount of time (greater than the dwell time threshold) consuming the content item(s) are considered for further processing and determining a literacy level of the user.

The filtered content items are transmitted to the testing engine 440 in order to determine a readability score for each content item. By one embodiment, the testing engine 440 may utilize a test model 435 e.g., a Flesch-Kincaid test model to determine a readability score of the content item. The readability score determined by the testing engine 440 is transmitted to the literacy level scoring unit 450.

By one embodiment, the literacy-level scoring unit 450 is configured to obtain information related to a literacy level of the user. For example, for each readability score of a content item (received from the testing engine 440), the literacy-level scoring unit 450 computes a literacy score in accordance with a scoring model 445. The scoring model may be configured to map/transform a readability score to a literacy score. For instance, if a readability score of a content item is high i.e., the content item is easy to comprehend/read, then the scoring model 445 may be configured to assign a low literacy score. It must be appreciated that the scoring model 445 may be configured to assign literacy score for the content item on a predetermined scale e.g., on a scale of 1 to 100, where a lower score indicates a lower level of literacy.

By one embodiment, the literacy level scoring unit 450 may be configured to determine a literacy score for each of the filtered content items and compute an overall literacy score (e.g., average score) based on the literacy scores computed for the filtered content items. The overall literacy score of the user is further refined by the literacy score refining unit 460, where after the refined literacy score of the user is stored in the literacy score database 465. It must be appreciated that the overall literacy score of the user may be stored in the literacy score database 465 without any refinement or only a small number of refinements as described next with reference to FIGS. 6-7.

Figure 5:
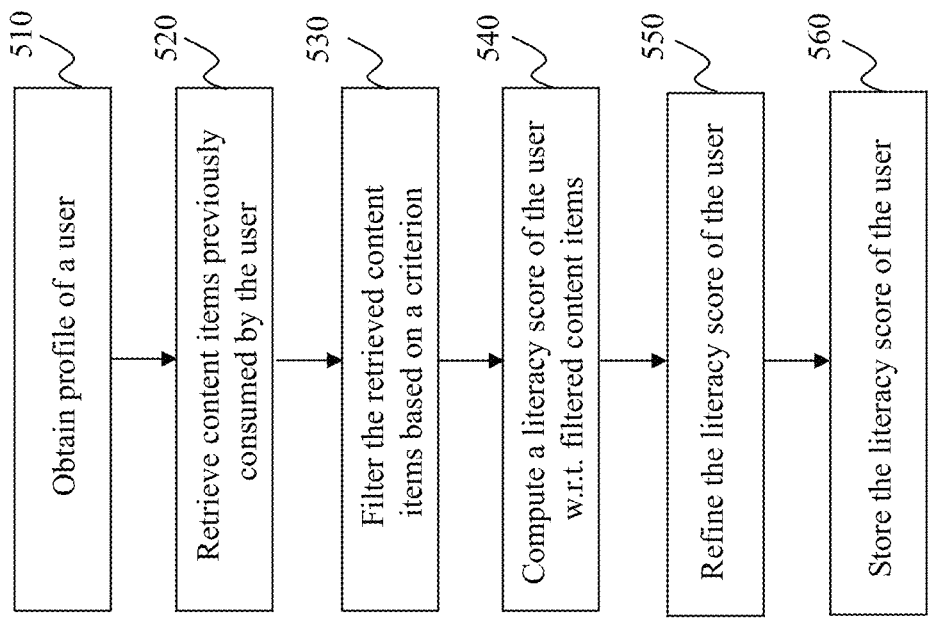
FIG. 5 is a flowchart of an exemplary process performed by a literacy level determiner, according to various embodiments of the present teaching.

FIG. 5 depicts a flowchart of an exemplary process performed by the literacy level determiner 320, according to various embodiments of the present teaching. The process commences in step 510 wherein a profile of a user is obtained. Based on the obtained profile, in step 520, content items previously consumed by the user are retrieved from a plurality of data sources.

In step 530, the retrieved content items are filtered based on a criterion. For instance, by one embodiment, the content items may be filtered based on a predetermined threshold dwell-time. In this manner, only the content items corresponding to which the user had spent a significant amount of time (greater than the dwell time threshold) consuming the content item(s) are considered for further processing. Moreover, it must be appreciated that the dwell time of a user with respect to a particular content item may be detected, for instance, by a web-application embedded in a webpage that displays the content item. The process then proceeds to step 540, wherein a literacy score of the user with respect to the filtered content items is computed. In step 550, the process refines the computed literacy score of the user, where after in step 560, the refined literacy score of the user is stored in a literacy score database.

Figure 6:
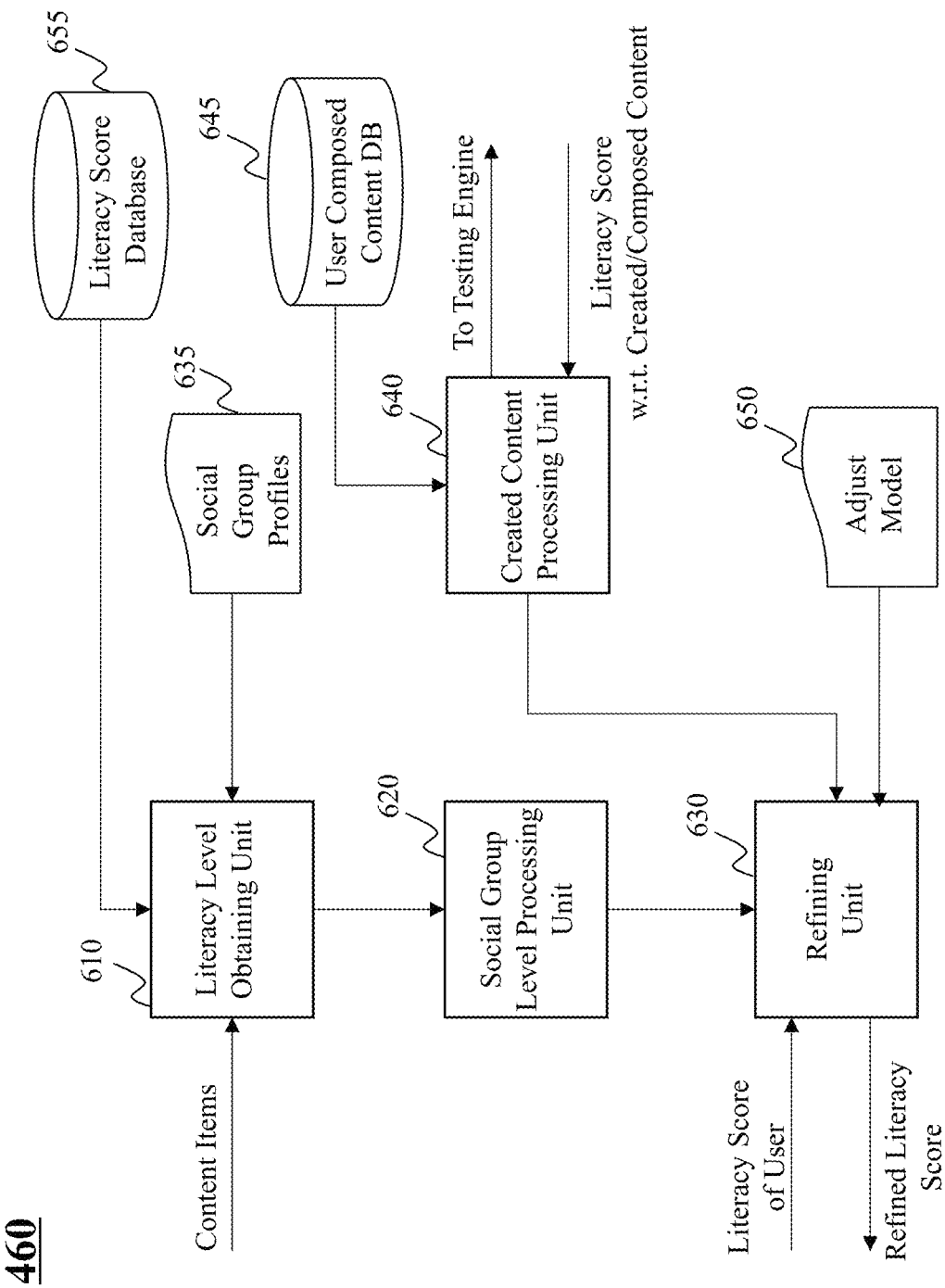
FIG. 6 depicts an exemplary system diagram of a literacy score refining unit, according to various embodiments of the present teaching.

FIG. 6 depicts an exemplary system diagram of a literacy score refining unit 460, according to various embodiments of the present teaching. The literacy score refining unit 460 includes a literacy level obtaining unit 610, a social group level processing unit 620, a refining unit 630, and a created/composed content processing unit 640.

The literacy level obtaining unit 610 retrieves content items previously consumed by the user. For each of the previously consumed content item, the literacy level obtaining unit 610 obtains social group profiles 635 of other users in order to determine the other users (e.g., users included in a social group of the user) that have also consumed the content item. For each of the other users that has consumed the content item previously consumed by the user, the literacy level obtaining unit 610 retrieves a literacy score corresponding to the other user from the literacy score database 655.

By one embodiment, the social group level processing unit 620 processes the literacy scores of other users (related to the user) that have consumed content items previously consumed by the user. For instance, the social group level processing unit 620 may compute an average literacy score of the other users that have consumed the same content items as the user. Further, the refining unit 630 obtains the processed literacy score of other users (via the social group level processing unit 620) as well the literacy score of the user. By one embodiment, the refining unit 630 may be configured to adjust the literacy score of the user based on the literacy scores of other users in accordance with an adjust model 650. In other words, the refining unit 630 may increase or decrease the literacy score of the user based on the literacy scores of the other users. For example, by one embodiment, the refining unit 630 may set the literacy score of the user to correspond to the average literacy scores of other users.

Furthermore, in addition to refining the literacy score of the user based on content items consumed by the user and other users, the literacy score refining unit 460 may be configured to refine the literacy score of the user based on content items composed (i.e., written) by the user. By one embodiment, the created content processing unit 640 is configured to obtain, from the user composed content database 645, a plurality of content items composed by the user. Each retrieved content item that is composed by the user is transmitted to the testing engine (FIG. 4) in order to obtain a literacy score of the composed content item. Specifically, referring to FIG. 4, the testing engine 440 and the literacy level scoring unit 450 may be utilized to obtain a literacy score of the composed content item by the user.

By one embodiment, the created content processing unit 640 obtains a literacy score corresponding to each content item composed by the user and further computes an average literacy score corresponding to the content items composed by the user. The refining unit 630 may utilize such an average literacy score of the composed content items to adjust/update the literacy score of the user. In this manner, the literacy score refining unit of the present teaching is configured to refine the literacy score of the user based on the content items previously consumed by the user and other users as well as refine the literacy score based on content items composed by the user.

Figure 7:
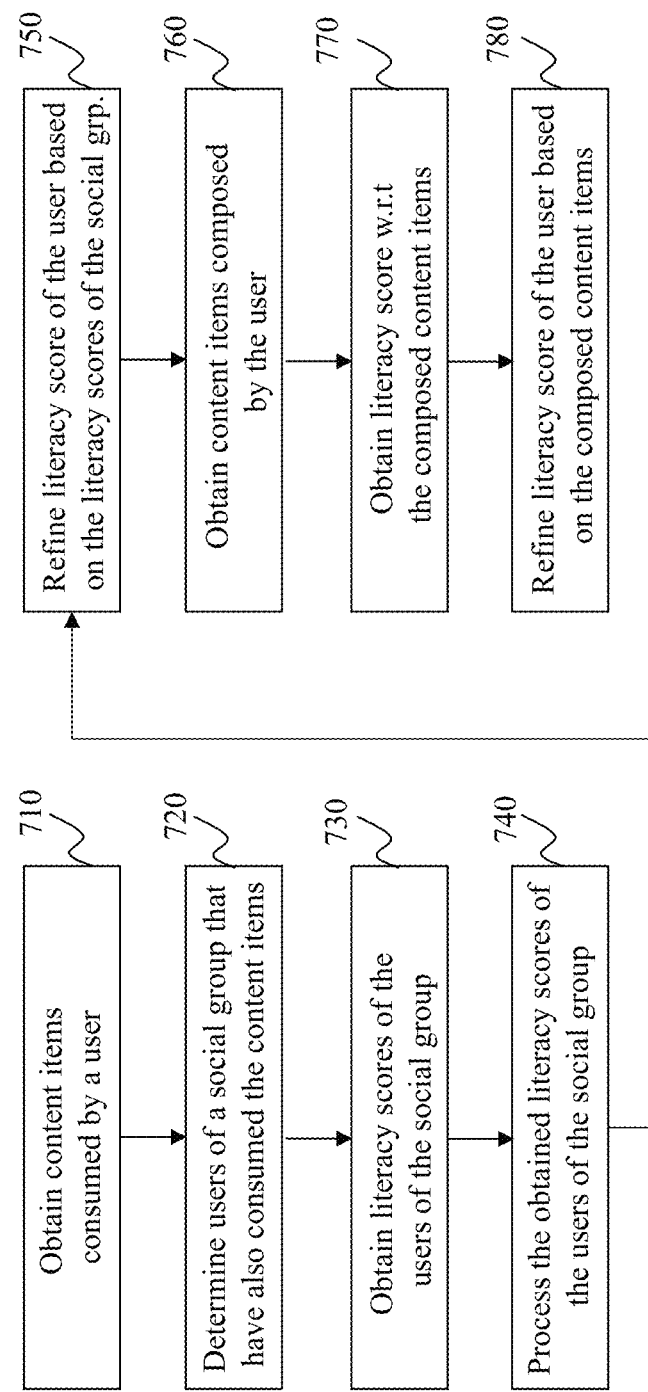
FIG. 7 is a flowchart of an exemplary process performed by a literacy score refining unit, according to various embodiments of the present teaching.

FIG. 7 is a flowchart of an exemplary process performed by the literacy score refining unit 460 according to various embodiments of the present teaching. The process commences in step 710, wherein content items consumed by the user are obtained. In step 720, other users (i.e., users of a social group) that have also consumed the content items consumed by the user are determined.

The process then proceeds to step 730, wherein literacy scores of the other users are obtained from the literacy score database. In step 740, the obtained literacy scores of the other users is processed, for example, to determine an average literacy score of the other users. In step 750, the process refines the literacy score of the user based on the processed literacy scores of the other users.

In step 760, the process obtains content items composed by the user. In step 770, literacy score with respect to each of the composed content item is obtained. It must be appreciated that the literacy score of the composed content item can be obtained (via the literacy level scoring unit of FIG. 4) based on a readability score of the composed content item (determined via the testing engine of FIG. 4). Upon obtaining the literacy scores of the composed content items, the process in step 780 refines the literacy score of the user based on the scores of the composed content items. It must be appreciated that the refining unit 460 as described above is in no way limited to refining the literacy score of the user in a manner as exactly described above. For instance, the literacy score refining unit may refine the literacy score of the user based only on content items previously consumed by the user and other users or refine the literacy score of the user based only on content items composed by the user, or alternatively refine the literacy score of the user based on both, the previously consumed content items as well as the composed content items.

Figure 8:
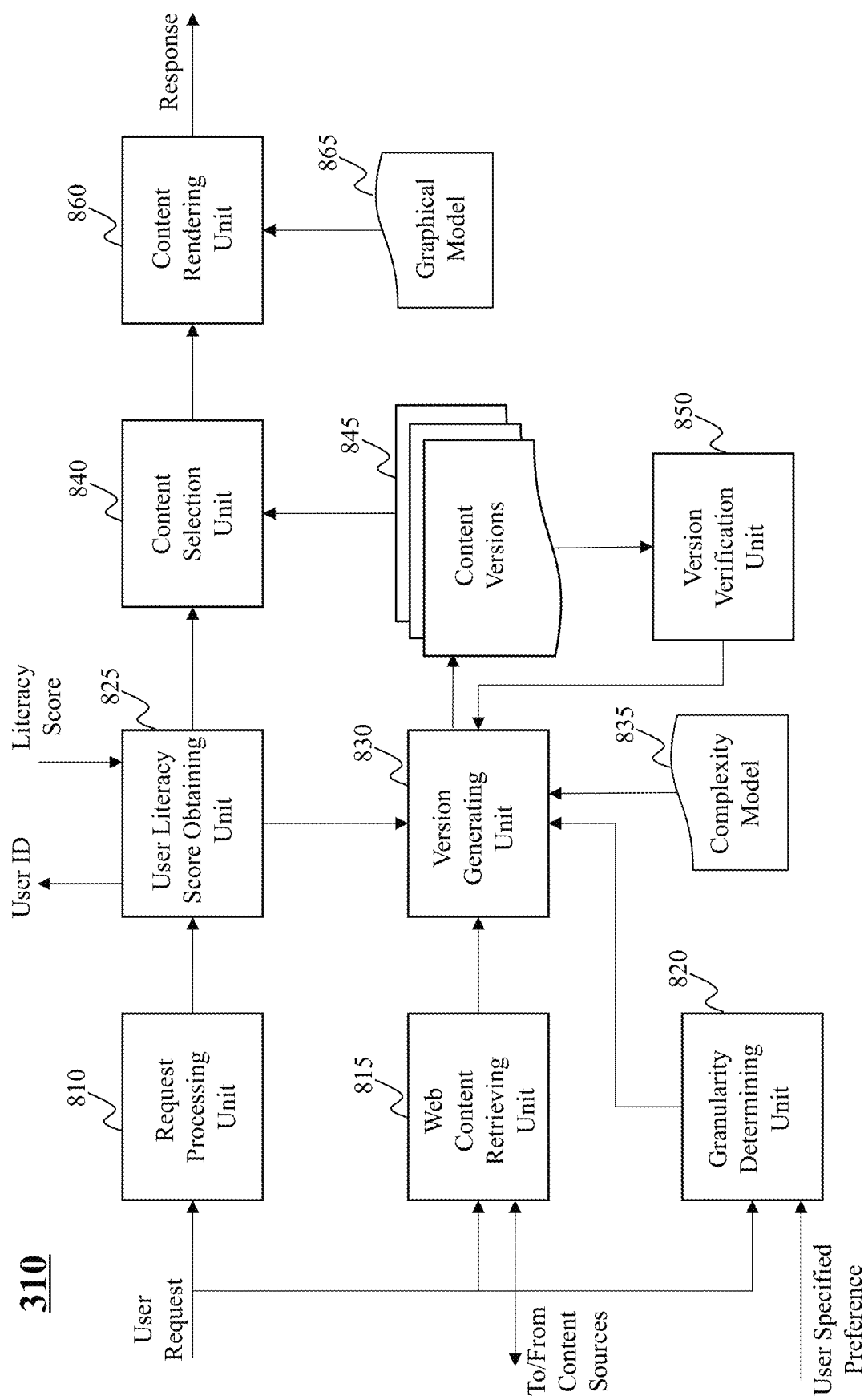
FIG. 8 depicts an exemplary system diagram of a text modifying unit, according to various embodiments of the present teaching.

FIG. 8 depicts an exemplary system diagram of a text modifying unit 310, according to various embodiments of the present teaching. The text modifying unit 310 includes a request processing unit 810, a web content retrieving unit 815, a granularity determining unit 820, a user literacy score obtaining unit 825, a version generating unit 830, a version verification unit 850, a content selection unit 840, and a content rendering unit 860.

The request processing unit 810 receives a user's request for obtaining a content item. The request processing unit 810 extracts metadata from the user's request e.g., an ID of the user. The extracted metadata i.e., ID of the user is used by the user literacy score obtaining unit 825 to retrieve a literacy score of the user from a literacy score database. The web content retrieving unit 815 is configured to retrieve a content item (that is to be provided to the user) from content sources based on the request.

The version generating unit 830 is configured to generate one or more versions of the content item. Specifically, the version generating unit 830 is configured to modify the content item in accordance with a model 835 by updating information (e.g., text) included in the content item based on the literacy score of the user to generate one or more updated content items 845. By one embodiment, the version generating unit 830 modifies the content item based on a granularity level of modification i.e., word level, phrase level, unigrams, bi-grams, etc. The granularity level may be determined by the granularity determining unit 820, which obtains the granularity level of modifying the content item from the user's request or alternatively obtains the granularity level specified by the user.

Each of the generated one or more versions of the content item is verified by the version verification unit 850. By one embodiment, the version verification unit 850 processes replaced text of the content item by inspecting for instance, a number of letters of syllables in the potential replacement text. It must be appreciated that a higher number of letter/syllables in a text word is associated with a lower readability score (i.e., it is more difficult to read a word with higher number of syllables). Accordingly, the version verification unit 850 may utilize the testing engine and the literacy level scoring units of FIG. 4 to determine a literacy score of the updated content item. If the literacy score of the updated content item is within a predetermined range of the literacy score of the user, the updated content item is deemed to be verified. However, if a difference in the literacy score of the updated content item and that of the user is greater than a predetermined threshold, the version of the content item may simply be ignored and the version generating unit may generate a new version of the content item.

All the verified versions of the content item are transmitted to the content selection unit 840, which is configured to select one version of the content item and transmit it to content rendering unit 860, which provides the updated content item (i.e., the selected version of the content item) to the user. By one embodiment, the content rendering unit 860 may utilize a graphical model 865 to enable an efficient mechanism of providing the content item to the user. For instance, by one embodiment of the present disclosure, the content rendering unit 860 may convert some of the replaced text into web-links, which direct to webpages with additional information on the replaced text. Additionally, or alternatively, the content rendering unit 860 may use the graphical model 865 to embed a pop-up box, which includes a short description of the replaced text. In this manner, whenever the user (upon being provided the content item) hovers his/her mouse in the vicinity of the replaced text, the pop-up box including the short description may be displayed to the user.

Figure 9:
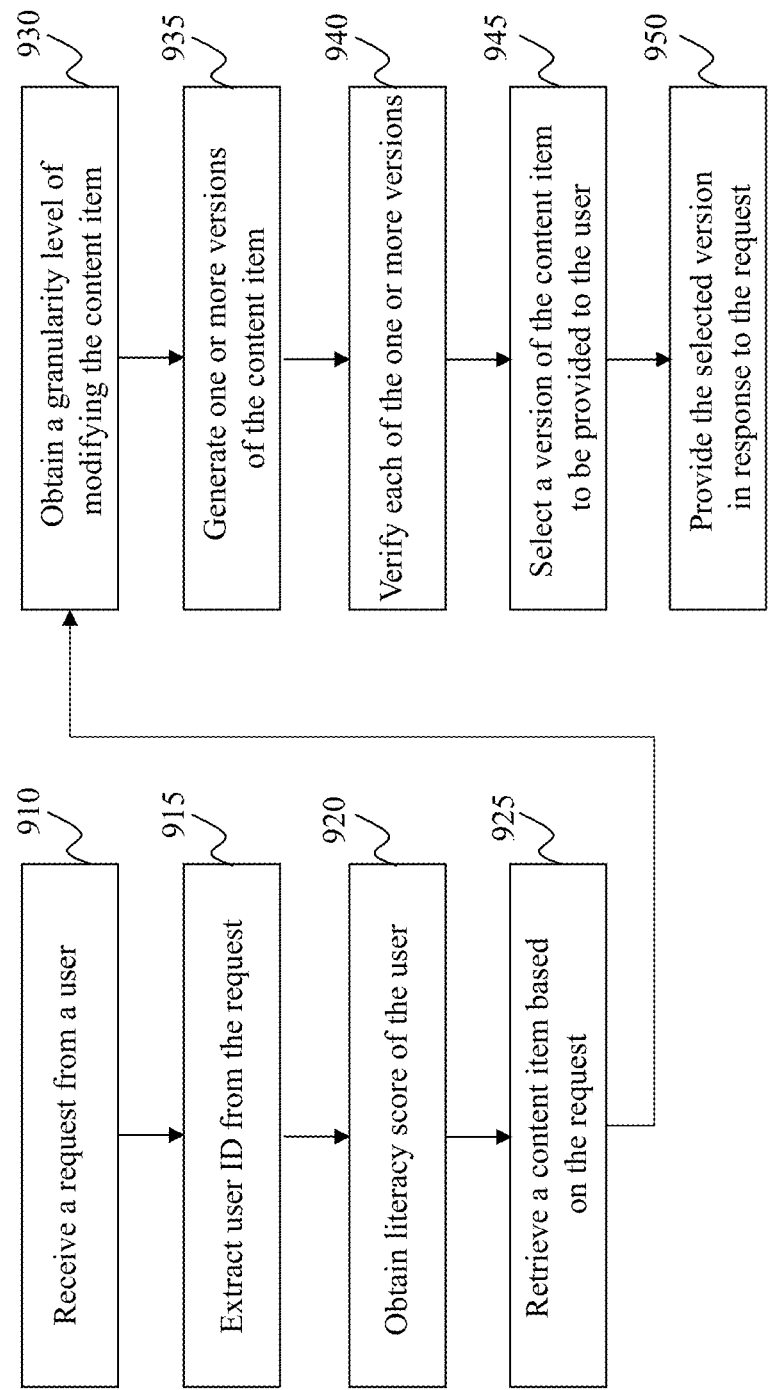
FIG. 9 is a flowchart of an exemplary process performed by a text modifying unit, according to various embodiments of the present teaching.

FIG. 9 is a flowchart of an exemplary process performed by the text modifying unit 310, according to various embodiments of the present teaching. The process commences in step 910, wherein a request from a user is received. In step 915, metadata (e.g., user ID) is extracted from the request. In step 920, based on the extracted ID of the user, a literacy score of the user is obtained from a literacy score database.

The process then moves to step 925, wherein a content item to be provided to the user is retrieved from a content source based on the request. In step 930, a granularity level of modifying the content item is obtained. In step 935, one or more versions of the content item are generated by modifying the content item based on the obtained granularity level. The process then moves to step 940, wherein each of the one or more generated versions of the content item is verified. In step 945, one version of the generated one or more versions is selected to be provided to the user. The selected version of the content item is provided to the user (in response to the request) in step 950, where after the process as depicted in FIG. 9 terminates.

Figure 10:
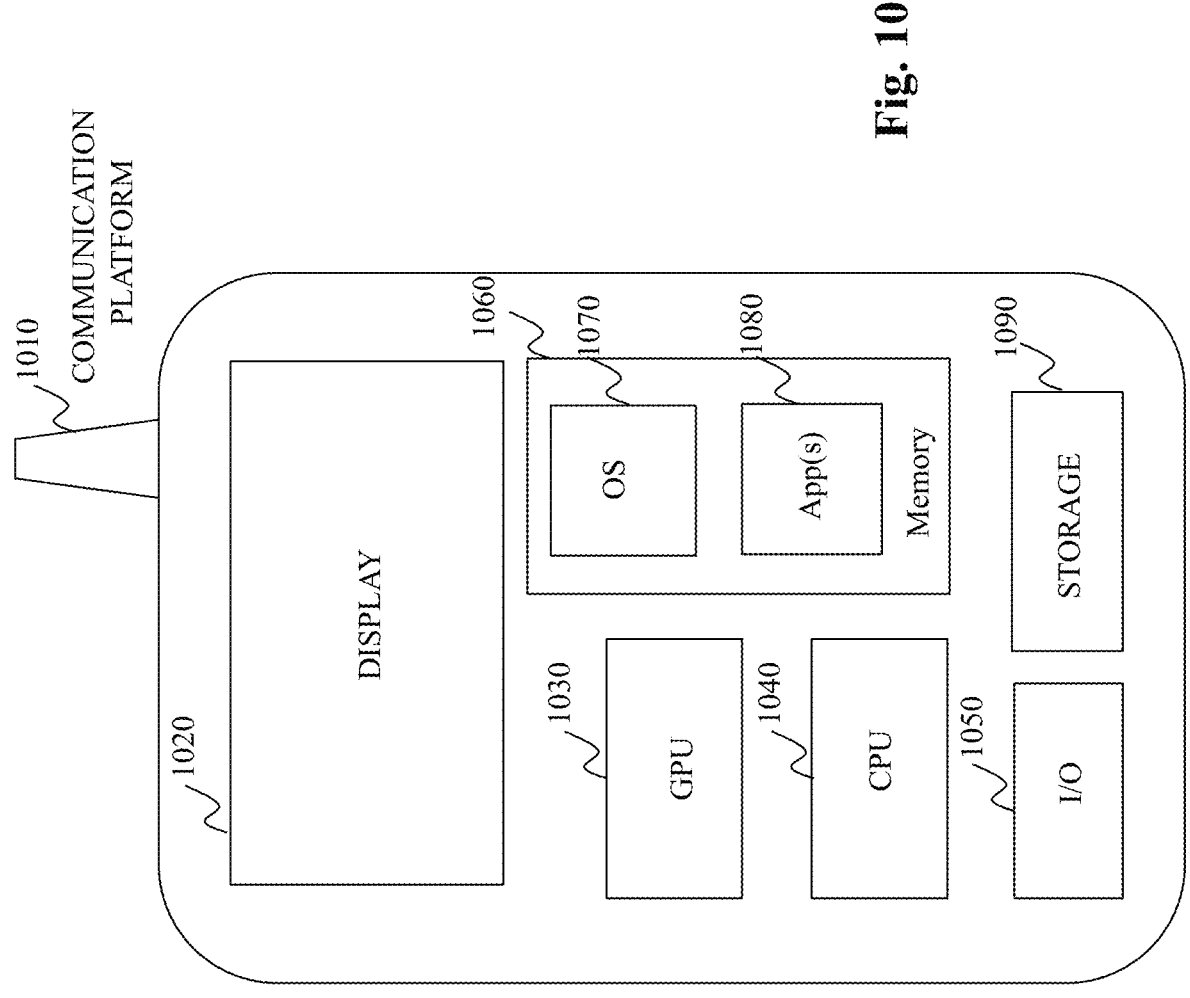
FIG. 10 depicts an architecture of a mobile device which can be used to implement a specialized system incorporating the present teaching.

Turning now to FIG. 10, there is depicted an architecture of a mobile device 1000, which can be used to realize a specialized system implementing the present teaching. In this example, a user device on which the functionalities of the various embodiments described herein can be implemented is a mobile device 1000, including, but not limited to, a smart phone, a tablet, a music player, a handled gaming console, a global positioning system (GPS) receiver, and a wearable computing device (e.g., eyeglasses, wrist watch, etc.), or in any other form factor.

The mobile device 1000 in this example includes one or more central processing units (CPUs) 1040, one or more graphic processing units (GPUs) 1030, a display 1020, a memory 1060, a communication platform 1010, such as a wireless communication module, storage 1090, and one or more input/output (I/O) devices 1050. Any other suitable component, including but not limited to a system bus or a controller (not shown), may also be included in the mobile device 1000. As shown in FIG. 10, a mobile operating system 1070, e.g., iOS, Android, Windows Phone, etc., and one or more applications 1080 may be loaded into the memory 1060 from the storage 1090 in order to be executed by the CPU 1040. The applications 1080 may include a browser or any other suitable mobile apps for performing the various functionalities on the mobile device 1000. User interactions with the content displayed on the display panel 1020 may be achieved via the I/O devices 1050.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 11:
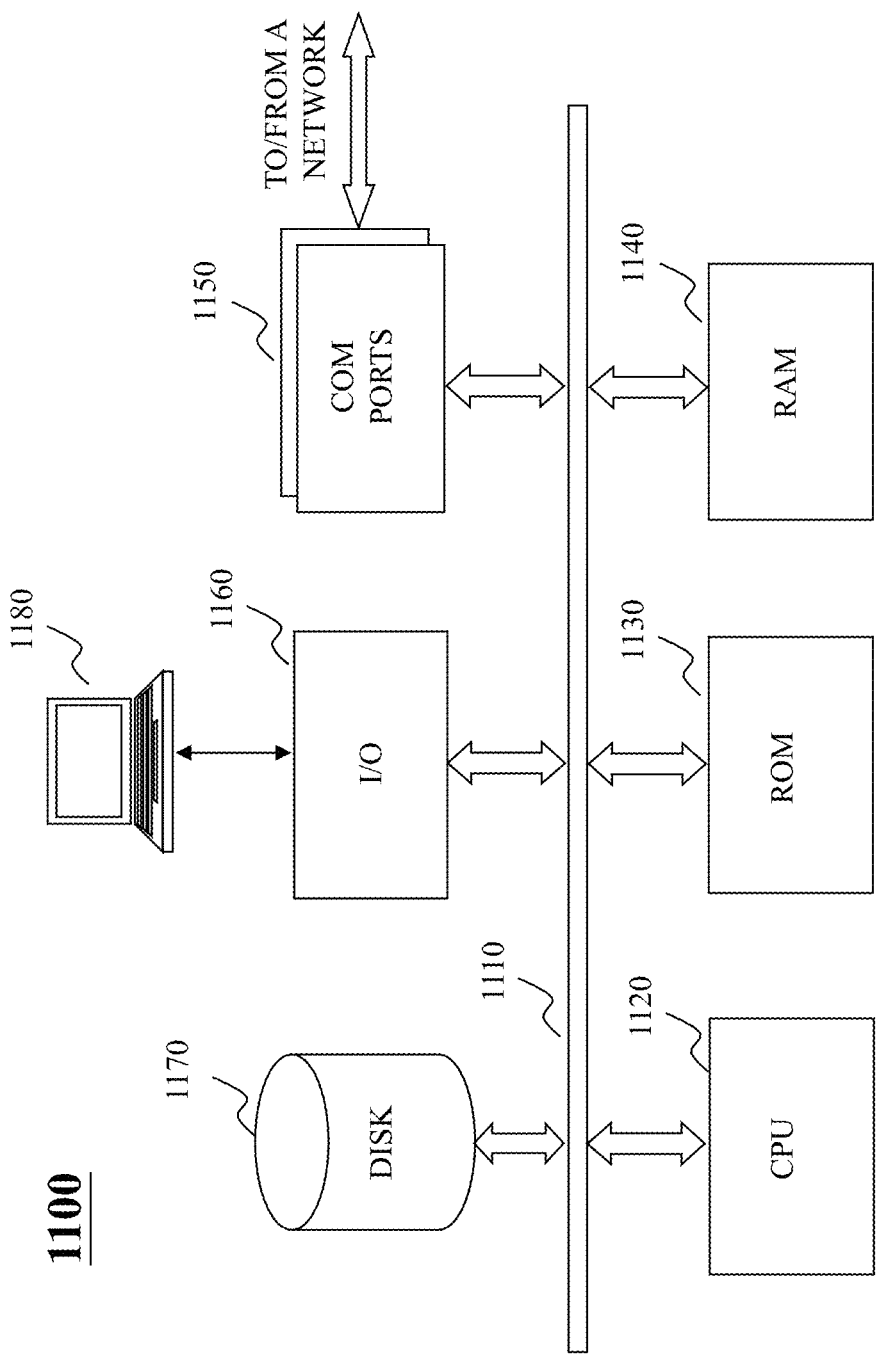
FIG. 11 depicts the architecture of a computer which can be used to implement a specialized system incorporating the present teaching.

FIG. 11 is an illustrative diagram of an exemplary computer system architecture, in accordance with various embodiments of the present teaching. Such a specialized system incorporating the present teaching has a functional block diagram illustration of a hardware platform which includes user interface elements. Computer 1100 may be a general-purpose computer or a special purpose computer. Both can be used to implement a specialized system for the present teaching. Computer 1100 may be used to implement any component(s) described herein. For example, the present teaching may be implemented on a computer such as computer 1100 via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 1100, for example, may include communication ports 1150 connected to and from a network connected thereto to facilitate data communications. Computer 1100 also includes a central processing unit (CPU) 1120, in the form of one or more processors, for executing program instructions. The exemplary computer platform may also include an internal communication bus 1110, program storage and data storage of different forms (e.g., disk 1170, read only memory (ROM) 1130, or random access memory (RAM) 1140), for various data files to be processed and/or communicated by computer 1100, as well as possibly program instructions to be executed by CPU 1120. Computer 1100 may also include an I/O component 1160 supporting input/output flows between the computer and other components therein such as user interface elements 1180. Computer 1100 may also receive programming and data via network communications.

Hence, aspects of the present teaching(s) as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of the literacy-aware content modification engine into the hardware platform(s) of a computing environment or other system implementing a computing environment or similar functionalities in connection with literacy-aware content modification. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the literacy-aware content modification engine, as disclosed herein, may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:
1. A method, implemented on a machine having at least one processor, storage, and a communication platform capable of connecting to a network for content personalization, the method comprising:
   retrieving, by a content modification engine, content items previously consumed by a user;
   detecting, by the content modification engine, via a web-application embedded in one or more webpages, a dwell time associated with the user while consuming each of the content items;
   removing, by the content modification engine, based on the dwell times associated with the content items, at least one of the content items on which the user spent less than a threshold dwell time;
   obtaining, by the content modification engine, based on remaining content items, information indicative of a literacy-level of the user, wherein the obtained information indicative of the literacy-level of the user is stored in a database;
   retrieving, by the content modification engine, according to a request from the user, a first content item to be provided to the user;
   generating, by the content modification engine, multiple versions of the first content item
      retrieving, from the database based on metadata of the request, the information indicative of the literacy-level of the user, and
      updating, based on the literacy-level of the user, information included in the first content item to generate the multiple versions of the first content item;
   selecting, by the content modification engine, one of the multiple versions based on a difference between an overall literacy-score of the user indicated by the literacy-level of the user and a literacy-score of the selected version; and
   providing, by the content modification engine, via the one or more webpages, the selected version of the first content item to the user in response to the request.

2. The method of claim 1, wherein the information indicative of the literacy-level of the user includes the overall literacy-score of the user.

3. The method of claim 2, further comprising:
   obtaining, for each of the content items, a readability score in accordance with a testing model;
   generating, based on the readability score, a literacy-score for the content item in accordance with a scoring model; and
   calculating the overall literacy-score of the user based on the literacy-scores of the content items.

4. The method of claim 2, further comprising:
   refining the literacy-score of the user based on overall literacy-scores of other users, each of whom has consumed content items previously consumed by the user.

5. The method of claim 2, further comprising:
   obtaining one or more content items composed by the user; and
   refining the literacy-score of the user based on the one or more content items composed by the user.

6. The method of claim 1, further comprising:
   obtaining a granularity level of updating the first content item;

generating the multiple versions of the first content item by updating the information included in the first content item based on the granularity level; and selecting one of the one of the multiple versions to correspond to the updated first content item to be provided to the user.

7. A non-transitory computer readable medium including computer executable instructions, wherein the instructions, when executed by a content modification engine, cause the content modification engine to perform a method for content personalization, the method comprising:

retrieving content items previously consumed by a user;

detecting, via a web-application embedded in one or more webpages, a dwell time associated with the user while consuming each of the content items;

removing, based on the dwell times associated with the content items, at least one of the content items on which the user spent less than a threshold dwell time;

obtaining, based on remaining content items, information indicative of a literacy-level of the user, wherein the obtained information indicative of the literacy-level of the user is stored in a database;

retrieving, according to a request from the user, a first content item to be provided to the user;

generating multiple versions of the first content item by:
retrieving, from the database based on metadata of the request, the information indicative of the literacy-level of the user, and
updating, based on the literacy-level of the user, information included in the first content item to generate the multiple versions of the first content item;

selecting one of the multiple versions based on a difference between an overall literacy-score of the user indicated by the literacy-level of the user and a literacy-score of the selected version; and providing, via the one or more webpages, the selected version of the first content item to the user in response to the request.

8. The medium of claim 7, wherein the information indicative of the literacy-level of the user includes the overall literacy-score of the user.

9. The medium of claim 8, wherein the instructions, when executed by the content modification engine, cause the content modification engine to further perform:
obtaining, for each of the content items, a readability score in accordance with a testing model;
generating, based on the readability score, a literacy-score for the content item in accordance with a scoring model; and
calculating the overall literacy-score of the user based on the literacy-scores of the content items.

10. The medium of claim 8, wherein the instructions, when executed by the content modification engine, further cause the content modification engine to perform:
refining the literacy-score of the user based on overall literacy-scores of other users, each of whom has consumed content items previously consumed by the user.

11. The medium of claim 8, wherein the instructions, when executed by the content modification engine, further cause the content modification engine to perform:
obtaining one or more content items composed by the user; and
refining the literacy-score of the user based on the one or more content items composed by the user.

12. The medium of claim 7, wherein the instructions, when executed by the content modification engine, further cause the content modification engine to perform:

obtaining a granularity level of updating the first content item;

generating the multiple versions of the first content item by updating the information included in the first content item based on the granularity level; and selecting one of the one of the multiple versions to correspond to the updated first content item to be provided to the user.

13. A system for content personalization, the system comprising:

a content retrieving unit of a content modification engine implemented by a processor and configured to retrieve content items previously consumed by a user;

a content filtering unit of the content modification engine implemented by the processor and configured to:
detect, via a web-application embedded in one or more webpages, a dwell time associated with the user while consuming each of the content items, and
remove, based on the dwell times associated with the content items, at least one of the content items on which the user spent less than a threshold dwell time;

a literacy level scoring unit of the content modification engine implemented by the processor and configured to obtain, based on remaining content items, information indicative of a literacy-level of the user, wherein the obtained information indicative of the literacy-level of the user is stored in a database;

a web content retrieving unit of the content modification engine implemented by the processor and configured to retrieve, according to a request from the user, a first content item to be provided to the user based on the request;

a version generating unit of the content modification engine implemented by the processor and configured to generate multiple versions of the first content item by:
retrieving, from the database based on metadata of the request, the information indicative of the literacy-level of the user, and
updating, based on the literacy-level of the user, information included in the first content item to generate the multiple versions of the first content item;

a content selection unit of the content modification engine implemented by the processor and configured to select one of the multiple versions based on a difference between an overall literacy-score of the user indicated by the literacy-level of the user and a literacy-score of the selected version; and a content rendering unit of the content modification engine implemented by the processor and configured to provide, via the one or more webpages, the selected version of the first content item to the user in response to the request.

14. The system of claim 13, wherein the information indicative of the literacy-level of the user includes the overall literacy-score of the user.

15. The system of claim 14, further comprising:
a testing unit of the content modification engine implemented by the processor and configured to
obtain, for each of the content items, a readability score in accordance with a testing model,
generate, based on the readability score, a literacy-score for the content item in accordance with a scoring model, and
calculate the overall literacy-score of the user based on the literacy-scores of the content items.

16. The system of claim 14, further comprising:
a literacy score refining unit of the content modification engine implemented by the processor and configured to refine the literacy-score of the user based on overall literacy-scores of other users, each of whom has consumed content items previously consumed by the user.

17. The system of claim 14, further comprising:
a created content processing unit of the content modification engine implemented by the processor and configured to obtain one or more content items composed by the user; and
a literacy score refining unit of the content modification engine implemented by the processor and configured to refine the literacy-score of the user based on the one or more content items composed by the user.

18. The system of claim 13, further comprising:
a granularity determining unit of the content modification engine implemented by the processor and configured to obtain a granularity level of updating the first content item;
wherein the version generating unit is further configured to generate the multiple versions of the first content item by updating the information included in the first content item based on the granularity level; and
the content selection unit implemented is configured to select one of multiple versions to correspond to the updated first content item to be provided to the user.

* * * * *